(12) United States Patent
Arora

(10) Patent No.: US 8,306,212 B2
(45) Date of Patent: Nov. 6, 2012

(54) TIME-BASED WORK ASSIGNMENTS IN AUTOMATED CONTACT DISTRIBUTION

(75) Inventor: Sanjay Arora, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 372 days.

(21) Appl. No.: 12/708,767

(22) Filed: Feb. 19, 2010

(65) Prior Publication Data

US 2011/0206199 A1 Aug. 25, 2011

(51) Int. Cl.
 *H04M 3/00* (2006.01)
(52) U.S. Cl. ............................... 379/265.1; 379/266.06
(58) Field of Classification Search ............ 379/265.14, 379/266.03, 266.06, 265.1
 See application file for complete search history.

(56) References Cited

U.S. PATENT DOCUMENTS

| | | | |
|---|---|---|---|
| 4,163,124 A | 7/1979 | Jolissaint | |
| 4,389,400 A | 6/1983 | Ho | |
| 4,567,323 A | 1/1986 | Lottes et al. | |
| 4,737,983 A | 4/1988 | Frauenthal et al. | |
| 4,797,911 A | 1/1989 | Szlam et al. | |
| 4,894,857 A | 1/1990 | Szlam et al. | |
| 5,001,710 A | 3/1991 | Gawrys et al. | |
| 5,097,528 A | 3/1992 | Gursahaney et al. | |
| 5,101,425 A | 3/1992 | Darland | |
| 5,155,761 A | 10/1992 | Hammond | |
| 5,164,983 A | 11/1992 | Brown et al. | |
| 5,206,903 A | 4/1993 | Kohler et al. | |
| 5,210,789 A | 5/1993 | Jeffus et al. | |
| 5,274,700 A | 12/1993 | Gechter et al. | |
| 5,278,898 A | 1/1994 | Cambray et al. | |
| 5,291,550 A | 3/1994 | Levy et al. | |
| 5,299,260 A | 3/1994 | Shaio | |
| 5,309,513 A | 5/1994 | Rose | |
| 5,335,268 A | 8/1994 | Kelly, Jr. et al. | |
| 5,355,269 A | 10/1994 | Clausen | |
| 5,390,243 A | 2/1995 | Casselman et al. | |
| 5,436,965 A | 7/1995 | Grossman et al. | |
| 5,444,774 A | 8/1995 | Friedes | |
| 5,469,503 A | 11/1995 | Butensky et al. | |
| 5,469,504 A | 11/1995 | Blaha | |
| 5,473,773 A | 12/1995 | Aman et al. | |
| 5,479,497 A | 12/1995 | Kovarik | |
| 5,500,795 A | 3/1996 | Powers et al. | |
| 5,504,894 A | 4/1996 | Ferguson et al. | |
| 5,506,898 A | 4/1996 | Costantini et al. | |

(Continued)

FOREIGN PATENT DOCUMENTS

CA 2143198 1/1995

(Continued)

OTHER PUBLICATIONS

U.S. Appl. No. 11/064,367, filed Feb. 22, 2005, Flockhart et al.

(Continued)

*Primary Examiner* — Creighton Smith
(74) *Attorney, Agent, or Firm* — Sheridan Ross P.C.

(57) ABSTRACT

A contact center is described and systems, methods, and devices for processing work items within the contact center are provided. An Estimated Contact Handling Time (ECHT) is computed for one or more work items in the contact center and work items are distributed within the contact center at least partially based on the ECHT calculations. Thus, a time-based contact routing mechanism is provided to increase the efficiency with which a contact center operates.

20 Claims, 4 Drawing Sheets

U.S. PATENT DOCUMENTS

| | | | |
|---|---|---|---|
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,592,378 A | 1/1997 | Cameron et al. |
| 5,592,542 A | 1/1997 | Honda et al. |
| 5,594,726 A | 1/1997 | Thompson et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,872 A | 11/1997 | Flockhart et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,721,770 A | 2/1998 | Kohler |
| 5,724,092 A | 3/1998 | Davidsohn et al. |
| 5,740,238 A | 4/1998 | Flockhart et al. |
| 5,742,675 A | 4/1998 | Kilander et al. |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,818,907 A | 10/1998 | Maloney et al. |
| 5,825,869 A | 10/1998 | Brooks et al. |
| 5,828,747 A | 10/1998 | Fisher et al. |
| 5,838,968 A | 11/1998 | Culbert |
| 5,839,117 A | 11/1998 | Cameron et al. |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,901,214 A | 5/1999 | Shaffer et al. |
| 5,903,641 A | 5/1999 | Tonisson |
| 5,903,877 A | 5/1999 | Berkowitz et al. |
| 5,905,793 A | 5/1999 | Flockhart et al. |
| 5,915,012 A | 6/1999 | Miloslavsky |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandit |
| 5,940,496 A | 8/1999 | Gisby et al. |
| 5,941,983 A | 8/1999 | Gupta et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,038,293 A | 3/2000 | Mcnerney et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,052,723 A | 4/2000 | Ginn |
| 6,055,308 A | 4/2000 | Miloslavsky et al. |
| 6,058,179 A | 5/2000 | Shaffer et al. |
| 6,064,730 A | 5/2000 | Ginsberg |
| 6,064,731 A | 5/2000 | Flockhart et al. |
| 6,084,954 A | 7/2000 | Harless et al. |
| 6,088,441 A | 7/2000 | Flockhart et al. |
| 6,097,885 A | 8/2000 | Rayner |
| 6,115,462 A | 9/2000 | Servi et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |
| 6,240,417 B1 | 5/2001 | Eastwick et al. |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley et al. |
| 6,292,550 B1 | 9/2001 | Burritt |
| 6,295,353 B1 | 9/2001 | Flockhart et al. |
| 6,353,810 B1 | 3/2002 | Petrushin |
| 6,356,632 B1 | 3/2002 | Foster et al. |
| 6,363,411 B1 | 3/2002 | Dugan et al. |
| 6,366,668 B1 | 4/2002 | Borst et al. |
| 6,373,836 B1 | 4/2002 | Deryugin et al. |
| 6,389,028 B1 | 5/2002 | Bondarenko et al. |
| 6,389,132 B1 | 5/2002 | Price et al. |
| 6,389,400 B1 | 5/2002 | Bushey et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,463,148 B1 | 10/2002 | Brady |
| 6,463,346 B1 | 10/2002 | Flockhart et al. |
| 6,463,415 B2 | 10/2002 | St. John |
| 6,480,826 B2 | 11/2002 | Pertrushin |
| 6,487,290 B1 | 11/2002 | Le Grand |
| 6,490,350 B2 | 12/2002 | McDuff et al. |
| 6,519,570 B1 | 2/2003 | Faber et al. |
| 6,535,600 B1 | 3/2003 | Fisher et al. |
| 6,535,601 B1 | 3/2003 | Flockhart et al. |
| 6,546,087 B2 | 4/2003 | Shaffer et al. |
| 6,560,329 B1 | 5/2003 | Draginich et al. |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,584,191 B1 | 6/2003 | McPartlan et al. |
| 6,587,831 B1 | 7/2003 | O'Brien |
| 6,597,685 B2 | 7/2003 | Miloslavsky et al. |
| 6,614,903 B1 | 9/2003 | Flockhart et al. |
| 6,636,598 B1 | 10/2003 | Thomson et al. |
| 6,650,748 B1 | 11/2003 | Edwards et al. |
| 6,687,257 B1 | 2/2004 | Balasubramanian |
| 6,694,009 B1 * | 2/2004 | Anderson et al. ........ 379/266.06 |
| 6,697,457 B2 | 2/2004 | Pertrushin |
| 6,704,409 B1 | 3/2004 | Dilip et al. |
| 6,707,903 B2 | 3/2004 | Burok et al. |
| 6,714,643 B1 | 3/2004 | Gargeya et al. |
| 6,718,330 B1 | 4/2004 | Zenner |
| 6,748,414 B1 | 6/2004 | Bournas |
| 6,754,333 B1 | 6/2004 | Flockhart et al. |
| 6,766,013 B2 | 7/2004 | Flockhart et al. |
| 6,766,014 B2 | 7/2004 | Flockhart et al. |
| 6,772,202 B2 | 8/2004 | Wright |

| | | |
|---|---|---|
| 6,801,520 B2 | 10/2004 | Philonenko |
| 6,850,613 B2 | 2/2005 | McPartlan et al. |
| 6,859,529 B2 | 2/2005 | Duncan et al. |
| 6,937,993 B1 | 8/2005 | Gabbita et al. |
| 6,947,543 B2 | 9/2005 | Alvarado et al. |
| 6,968,509 B1 | 11/2005 | Chang et al. |
| 6,970,554 B1 | 11/2005 | Peterson et al. |
| 6,970,829 B1 | 11/2005 | Leamon |
| 7,013,344 B2 | 3/2006 | Megiddo |
| 7,023,979 B1 | 4/2006 | Wu et al. |
| 7,035,808 B1 | 4/2006 | Ford |
| 7,035,927 B2 | 4/2006 | Flockhart et al. |
| 7,043,007 B2 | 5/2006 | McPartlan et al. |
| 7,047,192 B2 | 5/2006 | Poirier |
| 7,050,566 B2 | 5/2006 | Becerra et al. |
| 7,068,775 B1 | 6/2006 | Lee |
| 7,072,966 B1 | 7/2006 | Benjamin et al. |
| 7,103,562 B2 | 9/2006 | Kosiba et al. |
| 7,127,058 B2 | 10/2006 | O'Connor et al. |
| 7,133,520 B1 | 11/2006 | Doyle et al. |
| 7,142,666 B1 | 11/2006 | Bates et al. |
| 7,158,628 B2 | 1/2007 | McConnell et al. |
| 7,200,219 B1 | 4/2007 | Edwards et al. |
| 7,222,075 B2 | 5/2007 | Petrushin |
| 7,257,552 B1 * | 8/2007 | Franco .................. 705/28 |
| 7,269,253 B1 | 9/2007 | Wu et al. |
| 7,272,223 B2 | 9/2007 | McCormack et al. |
| 7,346,532 B2 | 3/2008 | Kusama et al. |
| 7,372,857 B1 | 5/2008 | Kappler et al. |
| 7,372,952 B1 | 5/2008 | Wu et al. |
| 7,373,309 B2 | 5/2008 | Nishikawa et al. |
| 7,382,773 B2 | 6/2008 | Schoeneberger et al. |
| 7,406,098 B2 | 7/2008 | Taneja et al. |
| 7,418,094 B2 | 8/2008 | Golitsin et al. |
| 7,478,051 B2 | 1/2009 | Nourbakhsh et al. |
| 7,551,602 B2 | 6/2009 | Whitman, Jr. |
| 7,711,104 B1 | 5/2010 | Flockhart et al. |
| 2001/0040887 A1 | 11/2001 | Shtivelman et al. |
| 2001/0056349 A1 | 12/2001 | ST. John |
| 2002/0002464 A1 | 1/2002 | Pertrushin |
| 2002/0010587 A1 | 1/2002 | Pertrushin |
| 2002/0029213 A1 | 3/2002 | Borissov et al. |
| 2003/0016812 A1 | 1/2003 | Rodenbusch et al. |
| 2003/0026414 A1 | 2/2003 | Baker et al. |
| 2003/0095652 A1 | 5/2003 | Mengshoel et al. |
| 2003/0154184 A1 | 8/2003 | Chee et al. |
| 2003/0169870 A1 | 9/2003 | Stanford |
| 2003/0182310 A1 | 9/2003 | Charnock et al. |
| 2003/0231647 A1 | 12/2003 | Petrovykh |
| 2004/0010437 A1 | 1/2004 | Kiran et al. |
| 2004/0230675 A1 | 11/2004 | Freimuth et al. |
| 2005/0004828 A1 | 1/2005 | deSilva et al. |
| 2005/0013428 A1 | 1/2005 | Walters |
| 2005/0041580 A1 | 2/2005 | Petrovykh |
| 2005/0065837 A1 | 3/2005 | Kosiba et al. |
| 2005/0071211 A1 | 3/2005 | Flockhart et al. |
| 2005/0071212 A1 | 3/2005 | Flockhart et al. |
| 2005/0071241 A1 | 3/2005 | Flockhart et al. |
| 2005/0071844 A1 | 3/2005 | Flockhart et al. |
| 2005/0129212 A1 | 6/2005 | Parker |
| 2005/0135593 A1 | 6/2005 | Becerra et al. |
| 2005/0135600 A1 | 6/2005 | Whitman |
| 2005/0135601 A1 | 6/2005 | Whitman |
| 2006/0015388 A1 | 1/2006 | Flockhart et al. |
| 2006/0045255 A1 | 3/2006 | Peters et al. |
| 2007/0192414 A1 | 8/2007 | Chen et al. |
| 2008/0275751 A1 | 11/2008 | Flockhart et al. |
| 2008/0275752 A1 | 11/2008 | Flockhart et al. |
| 2008/0275766 A1 | 11/2008 | Flockhart et al. |

FOREIGN PATENT DOCUMENTS

| | | |
|---|---|---|
| CA | 2174762 | 3/1996 |
| EP | 0501189 | 9/1992 |
| EP | 0740450 | 10/1996 |
| EP | 0772335 | 5/1997 |
| EP | 0829996 | 3/1998 |
| EP | 0855826 | 9/1998 |
| EP | 0863651 | 9/1998 |
| EP | 0866407 | 9/1998 |
| EP | 0899673 | 3/1999 |
| EP | 0998108 | 5/2000 |
| EP | 1091307 | 4/2001 |
| EP | 1150236 | 10/2001 |
| EP | 1246097 | 10/2002 |
| GB | 2273418 | 6/1994 |
| GB | 2290192 | 12/1995 |
| JP | 06-019861 | 1/1994 |
| JP | H7-005907 | 1/1995 |
| JP | 2002-297900 | 10/2002 |
| WO | WO 96/07141 | 3/1996 |
| WO | WO 97/28635 | 8/1997 |
| WO | WO 98/56207 | 12/1998 |
| WO | WO 01/80540 | 10/2001 |

OTHER PUBLICATIONS

U.S. Appl. No. 11/069,739, filed Mar. 1, 2005, Flockhart et al.
U.S. Appl. No. 12/022,850, filed Jan. 30, 2008, Flockhart et al.
"Microsoft Project 2000 Training Manual", Microsoft Corporation. 2000, 431 pages.
"Applications, NPRI's Predictive Dialing Package," Computer Technology (Fall 1993), p. 86.
"Call Center Software You Can't Outgrow," Telemarketing® (Jul. 1993), p. 105.
"Chapter 9: Domain Name Services" (printed Mar. 31, 2003), at http://www.pism.com/chapt09/chapt09.html, 21 pages.
"eGain's Commerce 2000 Platform Sets New Standard for eCommerce Customer Communications," Business Wire (Nov. 15, 1999).
"Internet Protocol Addressing" (printed Mar. 31, 2003), at http://www.samspade.org/d/ipdns.html, 9 pages.
"Product Features," Guide to Call Center Automation, Brock Control Systems, Inc., Activity Managers Series™, Section 5—Company B120, p. 59, 1992.
"Product Features," Guide to Call Center Automation, CRC Information Systems, Inc., Tel-Athena, Section 5—Company C520, p. 95, 1992.
"The Advantages of Load Balancing in the Multi-Call Center Enterprise," Communication Without Boundaries, Avaya White Paper (Feb. 2002), pp. 1-13.
"VAST™, Voicelink Application Software for Teleservicing®," System Manager User's Guide, Digital Systems (1994), pp. ii, vii-ix, 1-2, 2-41 through 2-77.
"When Talk Isn't Cheap," Sm@rt Reseller, v. 3, n. 13 (Apr. 3, 2000), p. 50.
Avaya, Inc., "Better Implementation of IP in Large Networks," Avaya, Inc. 2002, 14 pages.
Avaya, Inc., "Voice Over IP Via Virtual Private Networks: An Overview," Avaya, Inc., Feb. 2001.
Avaya, Inc., Business Advocate Options, available at http://www.avaya.com, downloaded on Feb. 15, 2003, Avaya, Inc., 2003.
Avaya, Inc., Business Advocate Product Summary, available at http://www.avaya.com, downloaded on Feb. 15, 2003, Avaya, Inc. 2003.
Avaya, Inc., CentreVu Advocate, Release 9, User Guide, Dec. 2000.
Background of the Invention of the above-captioned application (previously provided).
BellSouth "Frequently Asked Questions: Domain Name Service FAQs" (printed Mar. 31, 2003, at https://registration.bellsouth.net/NASApp/DNSWebUI/FAQ.jsp, 4 pages.
Business Editors, High Tech Editors. IEX Enhances Award-Winning Workforce Management Solution Business Wire. New York: Jul. 31, 2001. p. 1.
Business Editors, Microdyne Outsourcing Rolls Out RightForce Workforce Management to Manage Bi-Coastal Contact Center and E-Services Staff Business Wire. New York: Dec. 4, 2001. p. 1.
Chavez, David, et al., "Avaya MultiVantage Software: Adapting Proven Call Processing for the Transition to Converged IP Networks," Avaya, Inc., Aug. 2002.
Dawson, "NPRI's Powerguide, Software Overview" Call Center Magazine (Jun. 1993), p. 85.
Dinda, Peter A., "A Prediction-based Real-time Scheduling Advisor", 2002, pp. 1-8.

Doo-Hyun Kim et al. "Collaborative Multimedia Middleware Architecture and Advanced Internet Call Center," Proceedings at the International Conference on Information Networking (Jan. 31, 2001), pp. 246-250.

Douglas W. Stevenson, et al.; "Name Resolution in Network and Systems Management Environments" (printed Mar. 31, 2003), at http://netman.cit.buffalo.edu/Doc/Dstevenson/NR-NMSE.html, 16 pages.

E. Noth et al., "Research Issues for the Next Generation Spoken," University of Erlangen-Nuremberg, Bavarian Research Centre for Knowledge-Based Systems, at http://www5.informatik.uni-erlangen.de/literature/psdir/1999/Noeth99:RIF.ps.gz, 8 pages.

Eder, Johann et al. "Time Management in Workflow Systems." BIS'99 3rd International Conference on Business Information Systems (1999).

Evenson et al., Effective Call Center Management: Evidence from Financial Services, The Wharton Financial Institutions Center, Jan. 1999.

Foster, Robin, et al., "Avaya Business Advocate and its Relationship to Multi-Site Load Balancing Applications," Avaya, Inc., Mar. 2002.

Judge et al., Agent-enhanced workflow, BT Technologies Journal, vol. 16 No. 3, 1998.

Levent M. Arslan et al., "Language Accent Classification in American English," Robust Speech Processing Laboratory, Duke University Department of Electrical Engineering, Technical Report RSPL-96-7, revised Jan. 29, 1996, pp. 1-16.

Levent M. Arslan, "Foreign Accent Classification in American English," Dissertation submitted to Department of Electrical Computer Engineering, Graduate School of Duke University, (1996), pp. 1-201.

Microsoft Corporation. "User's Guide: Microsoft Project: Business Project Planning System Version 4.1 for Windows 95 or Version 4.0 for Windows 3.1." 1995. pp. 1-40 (Chapters 1-4).

MIT Project Oxygen, "Pervasive, Human-Centered Computing—Oxygen," MIT Laboratory for Computer Science, (Jun. 2000), pp. 1-15.

Morris et al., Sardine: Dynamic Seller Strategies in an Auction Marketplace, EC'OO, ACM, Oct. 17-20, 2000, p. 128-134.

Presentation by Victor Zue, "The MIT Oxygen Project," MIT Laboratory for Computer Science, Cambridge, MA (Apr. 25-26, 2000), 9 pages.

Rabun, Andy and Jim Sommers. "Microsoft Project 98 Support Course", Microsoft Corporation. Jun. 1998, 879 pages.

Sarah Ahmed; "A Scalable Byzantine Fault Tolerant Secure Domain Name System," Thesis submitted to Department of Electrical Engineering and Computer Science, Massachusetts Institute of Technology (Jan. 22, 2001), pp. 1-101.

Scott Coles; "A Guide for Ensuring Service Quality in IP Voice Networks," Communication Without Boundaries, Avaya White Paper (Jun. 2002), pp. 1-17.

Spraetz, Out with the new, in with the old: A look at scheduling alternatives, Customer Inter@ction Solutions; Nov. 2001: 20,5.

www.EIX.com (1998-2002) (http://web.archive.org/web/20020803000353/http://www.iex.com): Totalview The Workforce Management Solution, TotalView Product Literature: The Perfect Fit.

www.EIX.com (1998-2002) (http://web.archive.org/web/20020803000353/http://www.iex.com): Totalview The Workforce Management Solution, TotalView Product Literature: TotalView's Agent Webstation.

* cited by examiner

TIME-BASED WORK ASSIGNMENTS IN AUTOMATED CONTACT DISTRIBUTION

FIELD

The present invention is directed generally to communications and more particularly to contact centers.

BACKGROUND

Contact centers are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called vectoring. Normally in present-day Automated Contact Distributors (ACDs) when the ACD system's controller detects that an agent has become available to handle a contact, the controller identifies all predefined contact-handling queues for the agent (usually in some order of priority) and delivers to the available agent the highest-priority oldest contact that matches the agent's highest-priority queue.

Best service routing is one example of a routing logic used in centralized and distributed contact centers. In current best service routing, each ACD in the contact center uses a single message to represent a single skill and further describe the state of that skill. Copies of this single skill message are transmitted to all other ACDs in the contact center, thereby updating every ACD with the same state information for the transmitting ACD. By keeping each ACD in a contact center aware of all other ACD states, a uniform work item routing logic can be applied by all ACDs and intelligent routing decisions can be made in a distributed contact center.

One problem with current best service routing algorithms is that they are not sensitive to the amount of time which it will take to process a work item. This means that a queue may be ordered such that a first work item requiring a significant amount of time to process may have a higher queue position than a second work item requiring a minimal amount of time to process. This queue order may have been determined on a First In First Out (FIFO) basis or some other non-time-sensitive analysis of the work items. It does not seem logical from either the customer's standpoint or the contact center's standpoint to make the second work item wait for processing of the first work item, especially when the amount of wait time for the first work item would not substantially change if the second work item were queued ahead of it.

SUMMARY

It is thus one aspect of the present invention to provide an ACD or similar type of contact routing mechanism that is capable of considering an Estimated Contact Handling Time (ECHT) of work items in a contact center to (1) re-order an existing queue and/or (2) dynamically generate a new queue especially for the work item having a relatively low ECHT.

Determining the ECHT of work items received at a contact center can be accomplished in a number of different ways. As one example, if a work item is received from a customer having a communication history with the contact center, then the customer's historical records for work item processing time can be analyzed to determine an ECHT for the newly received work item. A historical average of previous work item processing times for the customer can be calculated as the ECHT.

As another example, the work item may be classified into a particular type or skill. This classification may be based on data received during the customer's interaction with an Interactive Voice Response (IVR) unit or similar data retrieval mechanism. The retrieved data can allow the contact center to define a work item type for the newly received work item. Thereafter, the contact center may determine work item processing times for similar work item types and apply such work item processing times in determining an ECHT for the newly received work item.

As yet another example, work item classifications and customer contact history can be considered in combination when determining an ECHT for the newly received work item.

As still another example, information related to the time-of-day in which the work item was received, location in which the customer resides, and potential linguistic differences between the contact center agent and customer may be considered when calculating an ECHT for the newly received work item. Other types of variables and data inputs may also be considered when calculating an ECHT for incoming work items.

In accordance with at least some embodiments of the present invention, once an ECHT has been calculated for some or all work items received in a contact center, the work items may be enqueued at least partially according to their ECHT. More specifically, work items may be ordered within a work item queue based completely on their ECHT, based partially on their ECHT, and/or based on their relative ECHT.

In some embodiments, a dynamic fast track queue may be created when two or more work items in a contact center or skill-based queue have an ECHT that is lower than a predetermined time threshold. In some embodiments, the fast track queue may be dynamically created when the number of work items in a contact center having an ECHT below a predetermined time threshold exceeds a predetermined number of work items, where the predetermined number of work items may be two, three, four, or more work items. In some embodiments, the value of this predetermined number of work items may be configured so as to avoid the possibility of misuse of this feature.

When a fast track queue is created for work items having an ECHT below a predetermined time threshold, embodiments of the present invention are capable of also populating a corresponding agent queue to service the fast track work item queue. The agents assigned to the corresponding agent queue may be specially designated agents who are particularly adept at handling work items with a relatively short ECHT. Once the fast track queue is emptied and no work items having an ECHT below the predetermined threshold remain in queue, the fast track queue may be closed or dissolved and the agents previously assigned to the corresponding agent queue may be re-assigned back to the regular skill-based queue. In some embodiments an agent is assigned to multiple(regular and fast track) skills/queues and there is no need to reassign and dissolve the dynamically created fast track queue.

In accordance with at least some embodiments of the present invention a method is provided that generally comprises:

receiving a first contact at a contact routing mechanism, the contact routing mechanism adapted to distribute contacts among a plurality of contact center resources;

generating a first work item representing the received first contact;

determining an Estimated Contact Handling Time (ECHT) of the first work item; and based on the ECHT of the first work item, causing at least one of the following substeps to be performed:
  (i) placing the first work item in a dynamically generated fast track queue; and
  (ii) placing the first work item in a higher queue position than a second work item having an ECHT larger than the ECHT of the first work item, wherein, in the absence of considering the ECHT of the first work item, the second work item would be in a higher queue position than the first work item.

As can be appreciated by one of skill in the art, a contact as used herein is understood to include voice calls, emails, chat, video calls, fax, Instant Messages (IMs), collaboration software, desktop sharing, conferences, and combinations thereof. Accordingly, a contact center may be equipped to handle any one or a number of the above-noted contacts. A work item may be generated as a logical representation of a contact received at a contact center and the work item may represent one or more tasks or services requested by the initiator of the contact. In some embodiments, there is a one-to-one relationship between work items and contacts. In other embodiments, multiple work items could represent a single contact.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system using a server(s) and/or data base(s), the invention is not limited to use with any particular type of communication system or configuration of system elements. Those skilled in the art will recognize that the disclosed techniques may be used in any computing application in which it is desirable to efficiently process work items in a contact center or similar queued environment.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
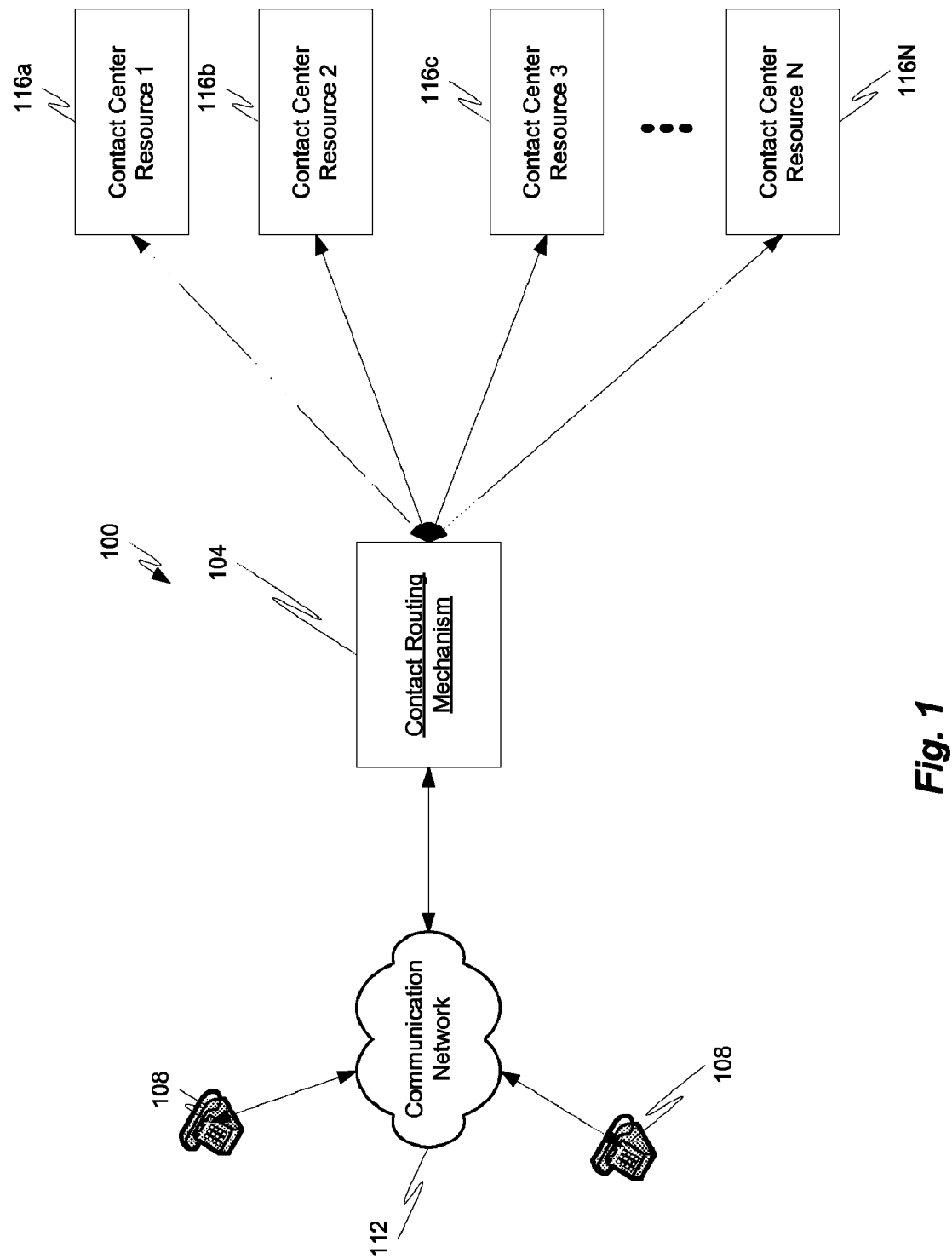
FIG. 1 is a block diagram depicting a communication system in accordance with embodiments of the present invention.

FIG. 1 shows an illustrative embodiment of a communication system 100 in accordance with at least some embodiments of the present invention. The communication system 100 generally comprises a contact center having a contact routing mechanism 104, such as an ACD, capable of communicating with a plurality of customer communication devices 108 via a communication network 112.

The contact routing mechanism 104 is generally adapted to distribute work items received by the contact center to a plurality of resources 112 within the contact center. As can be appreciated by one skilled in the art, the resources 112 of a contact center may not necessarily reside within a single contact center site but may remotely connect to the contact routing mechanism 104 via some sort of secured connection over a communication network. As one example, a contact center agent may be allowed to work remotely but connect their remote work station to the contact routing mechanism 104 of a particular contact center site using a secure connection such as a VPN, IPsec, or the like. Additionally, multiple contact center sites may be provided and each site may have its own contact routing mechanism 104. Such a configuration is known as a distributed contact center and is well known in the art. A contact center may also be distributed in the sense that its resources 112 may not necessarily reside on a common premises.

In accordance with at least some embodiments of the present invention, the communication network 112 may comprise any type of known communication medium or collection of communication mediums and may use any type of protocols to transport messages between endpoints. The communication network 112 may include wired and/or wireless communication technologies. The Internet is an example of the communication network 112 that constitutes and IP network consisting of many computers, computing networks, and other communication devices located all over the world, which are connected through many telephone systems and other means. Other examples of the communication network 112 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular network, and any other type of packet-switched or circuit-switched network known in the art. In addition, it can be appreciated that the communication network 112 need not be limited to any one network type, and instead may be comprised of a number of different networks and/or network types. Moreover, the communication network 112 may comprise a number of different communication mediums such as coaxial cable, copper cable/wire, fiber-optic cable, antennas for transmitting/receiving wireless messages, and combinations thereof.

The customer communication devices 108 may correspond to communication devices used by customers of the contact center to initiate a contact which ultimately result in the creation of a work item in the contact center. In accordance with at least some embodiments of the present invention, a customer may utilize their communication device 108 to initiate a work item, which is generally a request for service and generally requires the utilization of a processing resource 116a-N. Exemplary contacts which may result in the generation of a work item include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The contact may be in the form of a message or collection of messages transmitted over the communication network 112. For example, the contact may be transmitted as a telephone call, a packet or collection of packets (e.g., IP packets transmitted over an IP network), an email message, an Instant Message, an SMS message, a fax, and combinations thereof. A work item in the same or similar medium may be generated in the contact center and may be assigned to one or more contact center resources 116a-N, depending upon the nature of the work item.

The format of the work item may depend upon the capabilities of the communication device 108 and/or contact center resources 116a-N. In accordance with at least some embodiments of the present invention, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the contact center resources 116a-N.

The resources 116a-N may correspond to human agents, work stations operated by human agents, or fully automated resources such as an IVR, application server, voicemail server, or the like. The resources 116a-N may have one or more skills and a level of proficiency or capability for each of the one or more skills. In accordance with at least some embodiments of the present invention, a human skill may correspond to a language ability, an ability to handle a particular type of work item (e.g., troubleshooting, billing question, customer questions, maintenance, etc.), an ability to handle certain types of customers (e.g., general customers, higher priority customers, and highest priority customers), and the like. A machine skill may correspond to a number of ports, a processing capacity, a memory capacity, a web skill, hardware available, etc. In some embodiments, a human utilizing a particular type of work station may also have certain skills such as the ability to handle a certain type of work item (e.g., an agent using a work station with video capabilities has a video skill whereas an agent using a work station without video capabilities does not have a video skill). Other types of skills, such as fast track processing skills will be discussed in further detail herein.

Figure 2:
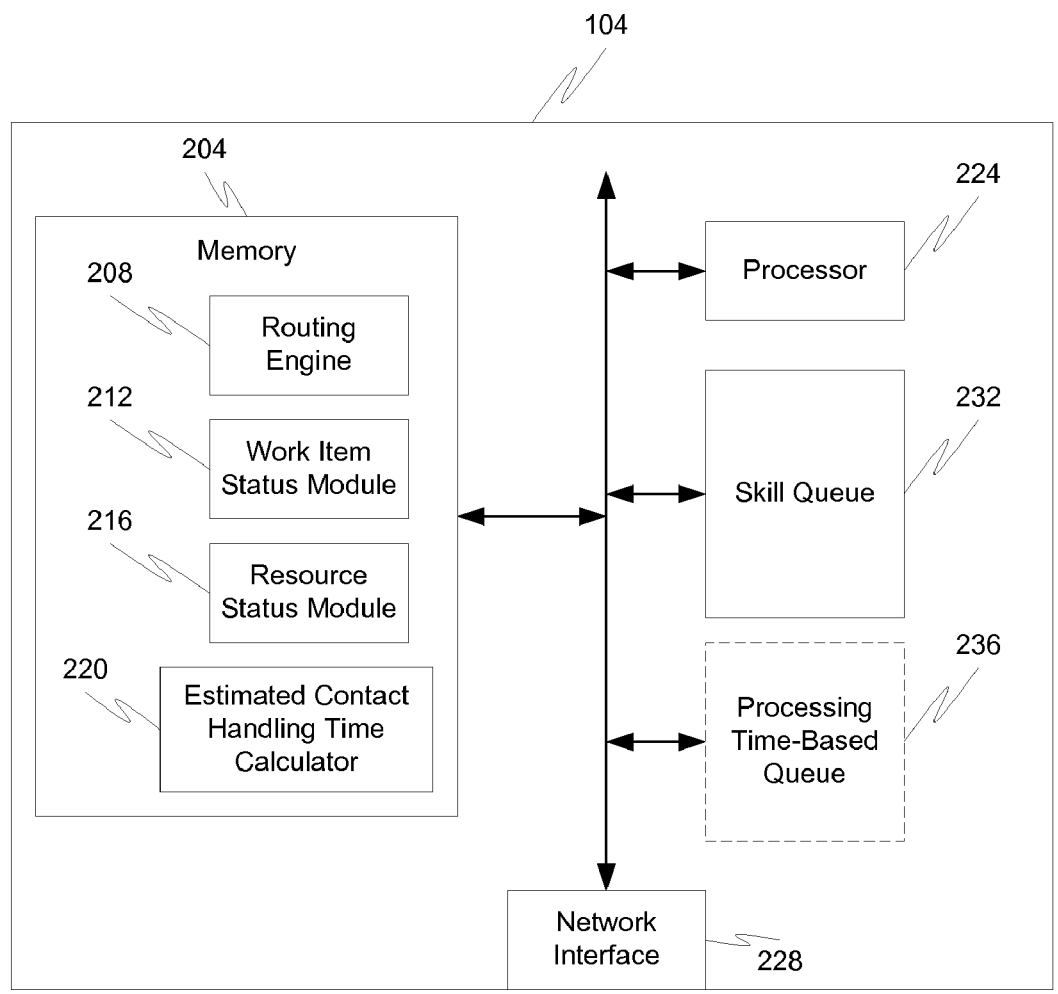
FIG. 2 is a block diagram depicting a contact routing mechanism in accordance with embodiments of the present invention.

With reference now to FIG. 2, additional details of a contact routing mechanism 104 will be described in accordance with at least some embodiments of the present invention.

Although certain components of the contact routing mechanism 104 are described as residing on and being implemented by the contact routing mechanism 104, one skilled in the art will appreciate that one or more of the components depicted in FIG. 2 may reside in a different contact center device and does not necessarily have to be implemented by the contact routing mechanism 104, although such a configuration may be desirable in certain configurations.

In accordance with at least some embodiments of the present invention, the contact routing mechanism 104 includes a network interface 228 which allows the contact routing mechanism 104 to connect to one or more of the communication networks 112. The network interface 228 may include a wired or wireless communication port and any associated hardware/software/driver needed to modulate or demodulate signals for transmission over or signals received from the communication network 112.

The contact routing mechanism 104 may also comprise a work item queue 232, such as a skill-based queue, having a plurality of queue positions. When a contact is received at the contact routing mechanism 104 and a work item is generated in association therewith, the contact routing mechanism 104 may place the work item in the queue 232 if no suitable resources 116 are currently available to process the work item. If a resource 116 is currently not available to receive a work item, then the work item is placed in a queue position. Although not depicted, the contact routing mechanism 104 may comprise a plurality of skill-based work item queues, each corresponding to a different skill. The queues may be organized similarly in that each queue may be a FIFO queue for different work items of different skills, where first received work items are the first work items routed to the next available resource 112 having the appropriate skills for servicing the work item. This logic can be altered, however, to accommodate higher priority work items and/or higher priority customers.

As can be appreciated, the contact routing mechanism 104 may also comprise a plurality of skill-based work item queues 232 for supporting different types of work items. As one example, a contact routing mechanism 104 may comprise a work item queue 232 for normal work items and other work items queues for higher priority work items initiated by priority customers.

Although not depicted, the contact routing mechanism 104 may further comprise a resource queue where available resources are placed in the event of a resource surplus, where resources 116 are idle and waiting for a new work item to enter the contact center. The resource queue may be similar in construction to the work item queue 232 in that it has a number of queue positions and resources 116 may be assigned a queue position according to longest idle time.

In accordance with at least some embodiments of the present invention, the contact routing mechanism 104 may comprise a number of resource queues corresponding to the various skills defined in the contact center. In some embodiments, if a plurality of work item queues 232 and resource queues are provided for different skills, then it may be possible to pair each skill-based work item queue 232 with a resource queue having a corresponding skill. This allows each skill to have either a work item surplus or a resource surplus. If all resources for a particular skill are currently processing a work item requiring such a skill and other work items are waiting in the corresponding work item queue 232, then that skill is determined to have a work item surplus. Conversely, if one or more resources for a particular skill are waiting in a resource queue to receive a work item having a corresponding skill, then that skill is determined to have a resource surplus.

In addition to having one or more traditional skill-based queues 232, the contact routing mechanism 104 may also be adapted to dynamically generate and manage a processing time-based queue 236. The processing time-based queue 236 may be generated in response to determining that a particular number of work items have an ECHT less than a predetermined amount of time. In some embodiments, the processing time-based queue 236 may be persistent, meaning that it continues to exist even in the absence of a work item surplus. In other embodiments, the processing-time based queue 236 may be temporary, meaning that it only exists when certain conditions are met (e.g., the existence of a fast-track qualifying work item surplus). When there are no longer any work items qualifying to be placed in the processing time-based queue 236, the queue 236 may be dissolved until it is needed at a later time.

In addition to comprising one or more queues 232, 236, the contact routing mechanism 104 may comprise one or more modules for managing the work flow within the various queues. More specifically, the contact routing mechanism 104 may comprise memory 204 and a processor 224 for executing the contents of the instructions stored in memory 204. In some embodiments, the memory 204 may include a routing engine 208 for making work item routing decisions, a work item status module 212 for determining whether there is a work item surplus for a particular skill and the extent of such a surplus, a resource status module 216 for determining whether there is a resource surplus for a particular skill and the extent of such a surplus, and an ECHT calculator 220 for determining an estimated handling or processing time of various work items at the contact routing mechanism 104.

Although depicted as two separate modules, the work item status module 212 and resource status module 216 may be combined into a single module that is capable of determining a status of one, two, or all of the skills of the contact center. In some embodiments, each combination of work item queues 232, 236 and resource queues may comprise a dedicated module or set of modules for determining a status of the skill shared between the queues. In other embodiments, a single module or set of modules may be adapted to determine the status of a plurality of skills.

The routing engine 208 may be adapted to examine the various work items and their ECHT to make work item routing decisions. As one example, the routing engine 208 may be adapted to move resources 116 from one resource queue to another resource queue, particularly in the event that a processing time-based queue 236 is dynamically generated in response to determining that there are work items in the skill queue 232 having an ECHT less than a predetermined amount of time. Other types of routing decisions that are well known may also be made by the routing engine 208, such as moving a work item or resource from one skill queue to another skill queue.

Some or all of the modules and/or queue may be provided on the contact routing mechanism 104 as free-standing hardware modules. Alternatively, or in addition, the modules and/or queue may be included as instructions stored in a computer-readable medium, such as local memory. In such an embodiment, the contact routing mechanism 104 may also include the processor 224 for executing the instructions stored on the computer-readable medium.

Figure 3A:
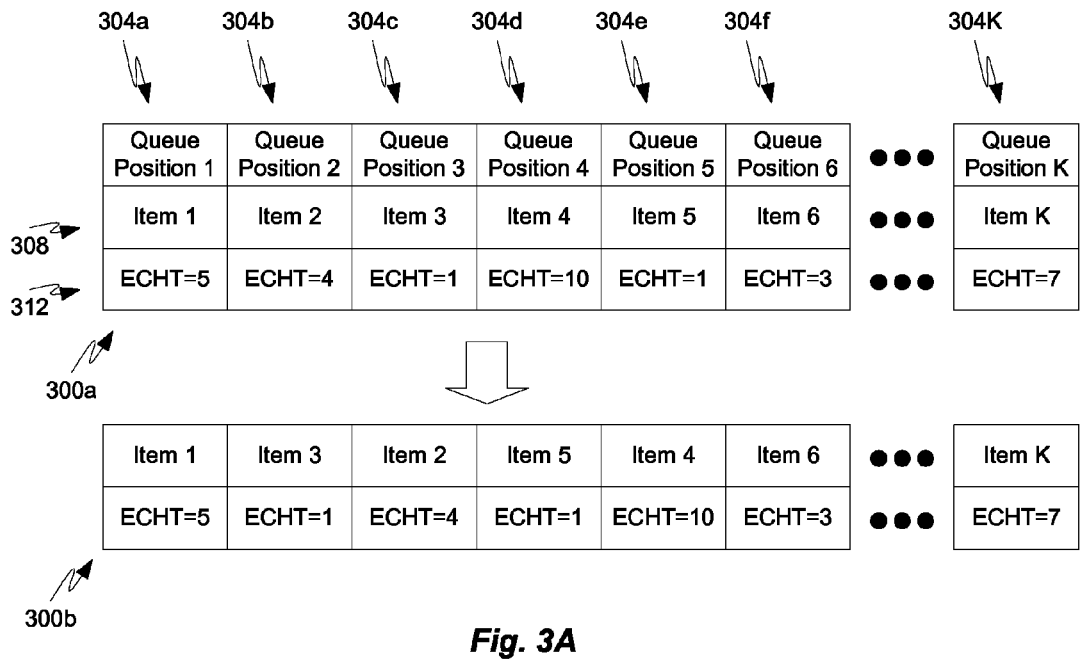
FIG. 3A is a block diagram depicting a first queue transition in accordance with embodiments of the present invention.
Figure 3B:
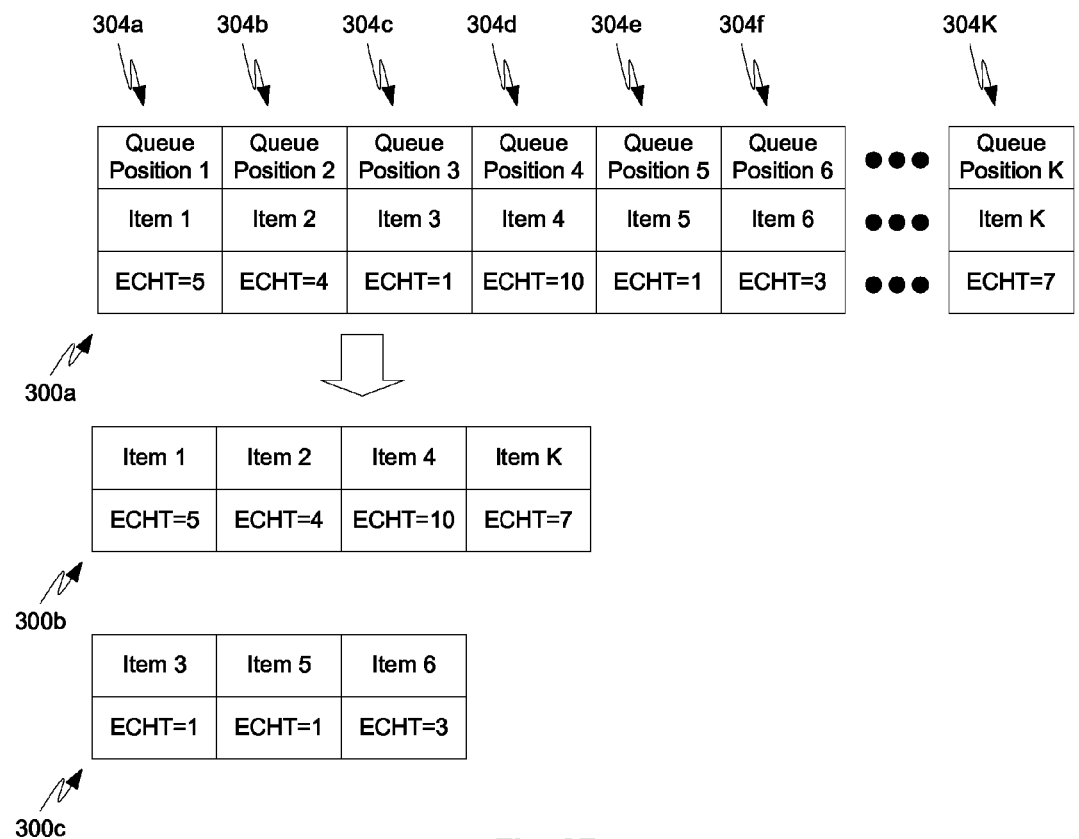
FIG. 3B is a block diagram depicting a second queue transition in accordance with embodiments of the present invention.

With reference now to FIGS. 3A and 3B, exemplary queue management schemas will be described in accordance with at least some embodiments of the present invention. Referring initially to FIG. 3A, a transition from a first configuration of a first queue 300a to a second configuration of the first queue 300b is depicted. One or both queues 300a, 300b may correspond to the skill-based queue 232.

The queues 300a, 300b may include a plurality of queue positions 304a-K, where the highest queue position 304a is originally assigned to a first work item, the next highest queue position 304b is originally assigned to a second work item, and so forth. Generally speaking, the queue 300a may correspond to a FIFO queue, meaning that by default and without considering an ECHT of any work item, the first work item received in the queue is given the highest position, the next received work item is given the next highest position, and so forth.

In accordance with at least some embodiments of the present invention, a work item identifier field 308 may be provided for each work item in the queue 300a, 300b. Furthermore, an ECHT field 312 may be provided for each work item, to help facilitate the re-organization of the queue in accordance with at least some embodiments of the present invention.

The ECHT calculator 220 may be utilized to determine the ECHT of each work item after or before the work item is placed in the queue. Once calculated, the work item status module 212 may compare the ECHT of a given work item to a predetermined amount of time to determine if the work item is eligible to be re-queued. In some embodiments, the ECHT of a work item is compared to an absolute number to determine if the work item is eligible to be moved up one or more queue positions. In other embodiments, the ECHT of a work item may be compared to the ECHT of work items in adjacent queue positions to determine if the work items should be re-queued relative to one another.

As can be seen in FIG. 3A, if the ECHT of a work item in a lower queue position is less then the ECHT of a work item in an adjacent but higher queue position (possibly by a predetermined amount of time that is greater than or equal to one unit of time), then the work item originally in the lower queue position may be re-queued to a higher queue position than the work item originally in the higher queue position. More specifically, the example depicted in FIG. 3A shows work item 5 being re-queued higher than work item 4, particularly because the ECHT of work item 5 is determined to be significantly less than the ECHT of work item 4. In some embodiments, if there is only a small difference between ECHTs (e.g., the smaller ECHT is more than 50% of the larger ECHT) of work items in adjacent queue positions, then no re-queuing may be necessary.

In accordance with at least some embodiments of the present invention, the work item status module 212 may be adapted to maintain a re-queue count for each of the work items in the queue. After work items are re-queued according to their respective ECHT, the work item status module 212 may be adapted to increment the re-queue count for the re-queued work items. The re-queue count is used to limit the number of times a given work item can be re-queued. More specifically, after the re-queue count for any work item exceeds a predetermined threshold the corresponding work item is restricted from being re-queued. Specifically in FIG. 3A, this predetermined threshold has been taken as unity.

Referring now to FIG. 3B, another queue transition schema is depicted in accordance with at least some embodiments of the present invention. The queue transition schema depicted in connection with FIG. 3B may be implemented individually or in combination with the schema depicted in connection with FIG. 3A. The first queue 300a may correspond to a skill-based queue 232 prior to re-organization, the second queue 300b may correspond to the skill-based queue 232 after re-organization, and the third queue 300c may correspond to a dynamically generated processing time-based queue 236. In accordance with at least some embodiments of the present invention, work items having an ECHT less than a predetermined amount of time (e.g., 5 units of time in the depicted example) may be transferred to the processing time-based queue 236 whereas work items having an ECHT greater than or equal to the predetermined amount of time remain in the skill-based queue 232. It may be possible that one or both of the second and third queues 300b, 300b may also be re-organized according to the re-organization schema described in connection with FIG. 3A.

Figure 4:
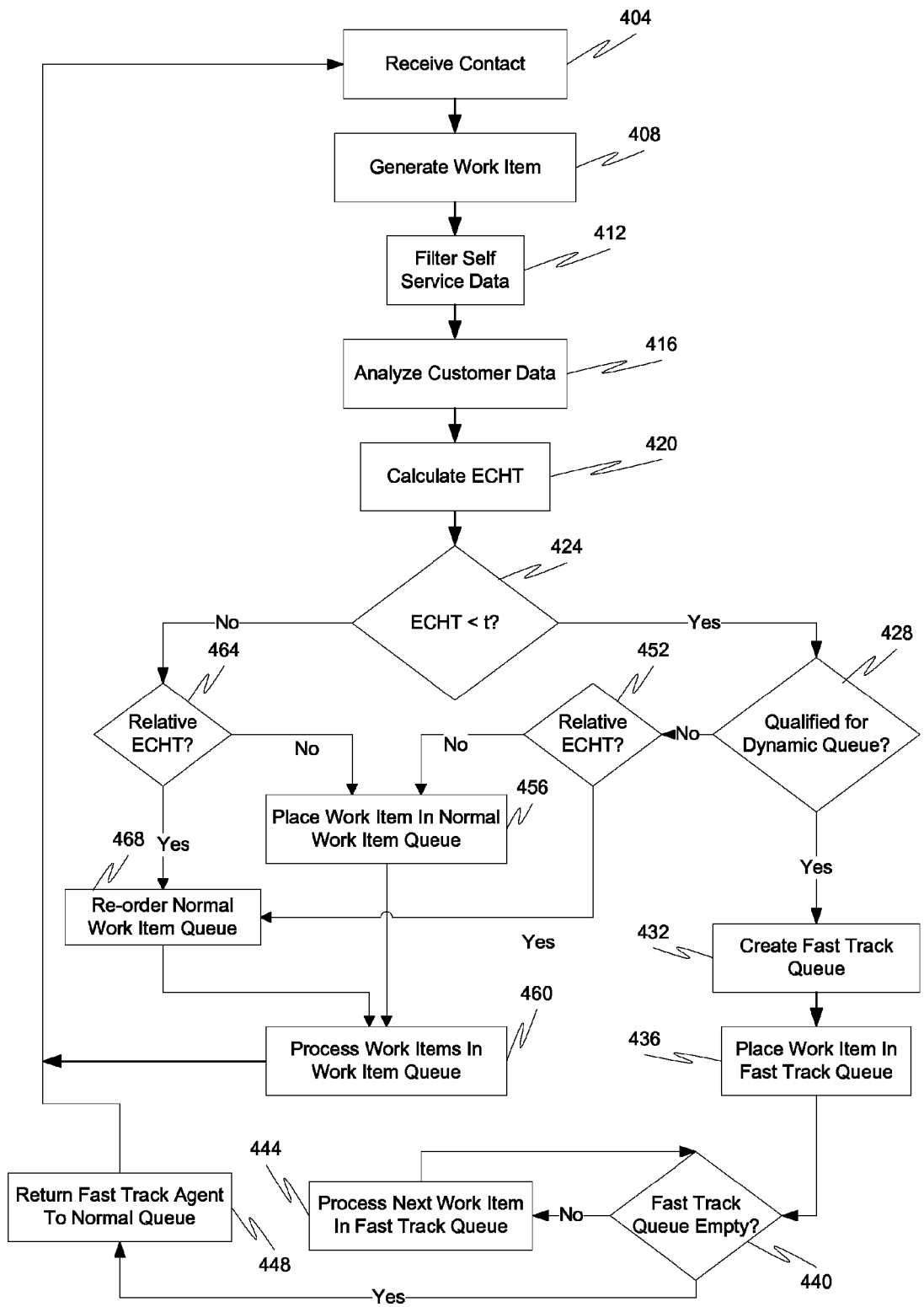
FIG. 4 is a flow diagram depicting an exemplary communication method in accordance with embodiments of the present invention.

With reference now to FIG. 4, an exemplary communication method will be discussed in accordance with at least some embodiments of the present invention. The method is initiated when a contact is received at the contact center and particularly at the contact routing mechanism 104 (step 404). The method continues with the contact routing mechanism 104 generating a work item or plurality of work items corresponding to the received contact.

During initial contact processing, an IVR (one instance of a contact center resource 116) may be adapted to connect with the customer who initiated the contact to retrieve customer data and other pertinent information from the customer without necessarily utilizing a human agent. During the interaction between the customer and the IVR or similar automated data retrieval mechanism, the contact routing mechanism 104 is provided with customer self-service data, some of which may be provided to the components of the contact routing mechanism 104 for further processing and some of which may be filtered as being irrelevant to the processing steps of the contact routing mechanism 104 (step 412). The customer data which passes through this initial filtering process may then be provided to the routing engine 208 and/or ECHT calculator 220 for further analysis (step 416).

In accordance with at least some embodiments of the present invention, the ECHT calculator is adapted to determine an ECHT for the work item (step 420). This calculation may be made by considering one or more customer data inputs and other relevant information such as work item type, customer contact history, time of day, customer age, customer language needs, etc.

In step 424 it is determined if the ECHT for the work item is less than a predetermined amount of time. In some embodiments, the predetermined amount of time may be configured by a contact center administrator. In some embodiments, the predetermined amount of time may vary depending upon certain contact center conditions and business goals. In some embodiments, the predetermined amount of time may be a variable amount of time which depends upon the ECHT of other already enqueued work items.

If the ECHT is determined to be less than the predetermined amount of time, then the method proceeds to step 428 where it is determined if the work item is qualified for a dynamic fast track queue. In some embodiments, this query may be answered affirmatively only if the number of enqueued work items having an ECHT less than the predetermined amount of time meets or exceeds a predetermined number of work items, thereby justifying the creation of existence of a special fast track queue. If there is only one enqueued work item having an ECHT less than the predetermined amount of time, then it may not be particularly advantageous to create a dedicated queue for that work item, although such an embodiment may still be implemented without departing from the scope of the present invention.

In some embodiments the query of step 428 may be answered affirmatively if a fast track queue has already been created prior to receiving the contact currently under inspection.

In the event that the work item is qualified for a fast track queue, then the method proceeds with the creation of the fast track queue otherwise referred to as the processing time-base queue 236 (step 432), unless the fast track queue is already in existence. Thereafter, the routing engine 208 places the qualifying work item(s) (i.e., work items having an ECHT less than the predetermined amount of time) in the newly created queue (step 436). The routing engine 208 also assigns one or more contact center resources 116 to the fast track queue for processing the work items contained therein. The resources assigned thereto may include agents having a specialize skill relating to a proficiency of processing fast track work items and/or computing resources particularly suited to the processing of fast track work items. Once resources have been assigned to the fast track queue, the processing of fast track work items begins until no work items remain in the fast track queue (steps 440 and 444).

After all work items in the fast track queue have been processed, the method continues with the routing engine 208 re-assigning the resources previously assigned to the fast track queue back to the normal skill-based queue (step 448). It should be noted that in some embodiments of the present invention that agents may be simultaneously assigned to the fast track queue and the normal skill-based queue, in which case re-assignment of the agents back to the normal skill-based queue may not be necessary. Thereafter, the method returns to step 404.

Referring back to the inquiry of step 428, if the work item is not qualified for being assigned to a dedicated fast track queue, the method may proceed by determining if a relative ECHT of the work item as compared to the ECHT of adjacent work items should be considered in connection with possibly re-ordering the normal skill-based queue (step 452).

If this query is answered affirmatively, then the method may continue by re-ordering the normal skill-based queue according to the relative ECHTs of work items in adjacent queue positions, such as is depicted in FIG. 3A (step 468). Once re-ordered, the method continues by processing the work items in the normal skill-based queue (step 460).

Referring back to step 452, if the relative ECHT is not to be considered in connection with re-ordering the normal skill-based queue, then the method proceeds by queuing the work item according to either the default order (e.g., FIFO) e (step 456). Thereafter, the method continues with the processing of the various work items in the queue by the various contact center resources 116 assigned to the corresponding resource queue (step 460). Then, the method then returns to step 404 to await receipt of the next contact.

Referring back to the inquiry of step 424, if the ECHT of the work item is not less than the predetermined amount of time, then the method continues by determining if a relative ECHT of the work item as compared to the ECHT of adjacent work items should be considered in connection with possibly re-ordering the normal skill-based queue, similar to step 452 (step 464). If this query is answered affirmatively, then the method proceeds to step 468. If this query is answered negatively, then the method proceeds to step 456.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA®, or a domain specific language, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for considering estimated work item processing times in connection with processing work items in a contact center. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
   receiving a first contact at a contact routing mechanism, the contact routing mechanism adapted to distribute contacts among a plurality of contact center resources;
   generating a first work item representing the received first contact;
   determining an Estimated Contact Handling Time (ECHT) of the first work item; and
   based on the ECHT of the first work item, causing at least one of the following substeps to be performed:
   (i) placing the first work item in a dynamically generated fast track queue, wherein the dynamically generated fast track queue is newly created to receive the first work item; and
   (ii) placing the first work item in a higher queue position than a second work item having an ECHT larger than the ECHT of the first work item, wherein, in the absence of considering the ECHT of the first work item, the second work item would be in a higher queue position than the first work item.

2. The method of claim 1, wherein both substeps (i) and (ii) are performed.

3. The method of claim 1, wherein substep (i) is performed.

4. The method of claim 3, further comprising:
   determining a number of work items in a work item queue having an ECHT less than a predetermined amount of time;
   determining that the number of work items in the work item queue having an ECHT less than the predetermined amount of time exceeds a predetermined number of work items; and
   populating the dynamically generated fast track queue with all of the work items determined to have an ECHT less than the predetermined amount of time.

5. The method of claim 4, further comprising:
   in response to generating the fast track queue, re-assigning one or more fast track agents from a skill-based queue to the fast track queue;
   determining that all work items in the fast track queue have been processed by the fast track agents; and
   after determining that all work items in the fast track queue have been processed, dissolving the fast track queue and assigning the fast track agents back to the skill-based queue.

6. The method of claim 1, wherein substep (ii) is performed.

7. The method of claim 6, wherein the first and second work items are in a FIFO queue, wherein the second work item was received at the contact routing mechanism prior to the first work item, and wherein an ECHT of the second work item is larger than a predetermined amount of time.

8. The method of claim 7, further comprising:
   maintaining a re-queue count for the first and second work items; and
   after substep (ii) is performed, incrementing the re-queue count for the first and second work items, wherein after the re-queue count for either the first or second work item exceeds a predetermined threshold the corresponding work item is restricted from being re-queued.

9. An automated contact distributor configured to distribute contacts among a plurality of resources in a contact center, the automated contact distributor comprising:
   at least one work item queue comprising a plurality of queue positions for assignment to one or more work items received at the automated contact distributor;
   an Estimated Contact Handling Time (ECHT) calculator adapted to determine an ECHT for work items received at the contact distributor; and
   a routing engine adapted to, based on the ECHT calculated for a first work item, perform at least one of the following:

(i) place the first work item in a dynamically generated fast track queue, wherein the dynamically generated fast track queue is created in response to calculating the ECHT for the first work item; and (ii) place the first work item in a higher queue position than a second work item having an ECHT larger than the ECHT of the first work item, wherein, in the absence of considering the ECHT of the first work item, the second work item would be in a higher queue position than the first work item.

10. The automated contact distributor of claim 9, wherein the routing engine performs action (i).

11. The automated contact distributor of claim 10, further comprising a work item status module adapted to determine a number of work items in the at least one work item queue having an ECHT less than a predetermined amount of time, determine that the number of work items in the work item queue having an ECHT less than the predetermined amount of time exceeds a predetermined number of work items, and trigger the creation of a fast track queue with all of the work items determined to have an ECHT less than the predetermined amount of time.

12. The automated contact distributor of claim 11, wherein the routing engine is further adapted to, in response to the creation of the fast track queue, re- assign one or more fast track agents from a skill-based queue to the fast track queue, determine that all work items in the fast track queue have been processed by the fast track agents, and after determining that all work items in the fast track queue have been processed, dissolve the fast track queue and assign the fast track agents back to the skill-based queue.

13. The automated contact distributor of claim 9, wherein the routing engine performs action (ii).

14. The automated contact distributor of claim 13, wherein the first and second work items are in a FIFO queue, wherein the second work item was received prior to the first work item, and wherein an ECHT of the second work item is larger than a predetermined amount of time.

15. The automated contact distributor of claim 13, further comprising a work item status module adapted to maintain a re-queue count for the first and second work items and after action (ii) is performed, increment the re-queue count for the first and second work items, wherein after the re-queue count for either the first or second work item exceeds a predetermined threshold the corresponding work item is restricted from being re-queued.

16. A contact center, comprising:
a plurality of contact center resources;
a contact routing mechanism configured to distribute work items among the plurality of contact center resources;
at least one work item queue comprising a plurality of queue positions for assignment to one or more work items received at the contact routing mechanism;
an Estimated Contact Handling Time (ECHT) calculator adapted to determine an ECHT for work items received at the contact distributor; and
a routing engine adapted to, based on the ECHT calculated for a first work item, perform at least one of the following:
(i) place the first work item in a dynamically generated fast track queue, wherein the dynamically generated fast track queue is newly created to receive the first work item; and
(ii) place the first work item in a higher queue position than a second work item having an ECHT larger than the ECHT of the first work item, wherein, in the absence of considering the ECHT of the first work item, the second work item would be in a higher queue position than the first work item.

17. The contact center of claim 16, wherein the routing engine and the ECHT calculator are provided in the contact routing mechanism.

18. The contact center of claim 16, wherein the routing engine performs action (i), the contact center further comprising a work item status module adapted to determine a number of work items in the at least one work item queue having an ECHT less than a predetermined amount of time, determine that the number of work items in the work item queue having an ECHT less than the predetermined amount of time exceeds a predetermined number of work items, and trigger the creation of a fast track queue with all of the work items determined to have an ECHT less than the predetermined amount of time.

19. The contact center of claim 16, wherein the routing engine performs action (ii).

20. The contact center of claim 19, wherein the first and second work items are in a FIFO queue, wherein the second work item was received at the contact routing mechanism prior to the first work item, and wherein an ECHT of the second work item is larger than a predetermined amount of time.

* * * * *